Oct. 28, 1930.  W. T. STONE  1,779,756
BATTERY TERMINAL CONNECTER
Filed Jan. 16, 1928
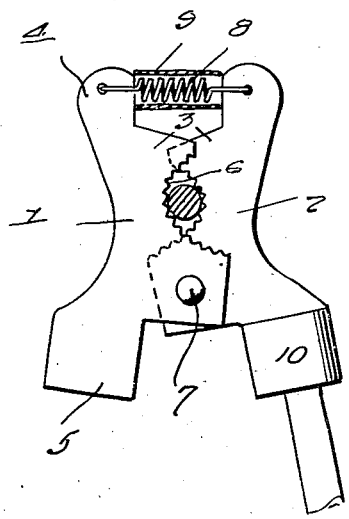
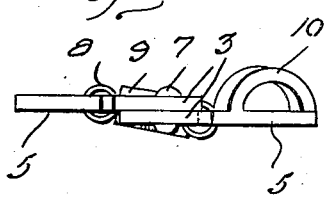
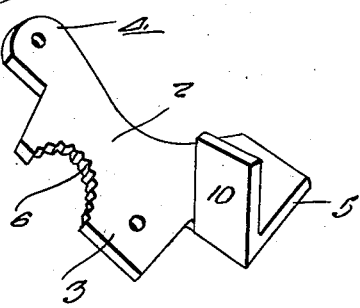
Inventor
W. T. Stone
By Clarence A. O'Brien
Attorney Patented Oct. 28, 1930

1,779,756

UNITED STATES PATENT OFFICE

WILLIAM T. STONE, OF DONNELLSON, IOWA

BATTERY-TERMINAL CONNECTER

Application filed January 16, 1928. Serial No. 247,137.

The present invention relates to a battery terminal connecter and has for its prime object to provide a device of this nature which may be easily engaged with and disengaged from the terminal of a battery for electrically connecting the conduit thereto.

Another important object of the invention resides in the provision of a device of this nature which is simple in its construction, inexpensive to manufacture, strong and durable, convenient, and thoroughly efficient and reliable in use.

With the above and numerous other objects in view as will appear as the description proceeds, the invention resides in certain novel features of construction and in the combination and arrangement of parts as will be hereinafter more fully described and claimed.

In the drawing:

Figure 1 is a top plan view of the connecter showing the same on a battery terminal, a sleeve of the connecter and the terminal being shown in section, Figure 2 is an edge elevation of the connecter, and Figure 3 is a perspective view of one section thereof.

Referring to the drawing in detail it will be seen that this connecter includes two plates 1 and 2. Each plate is of an elongated construction having a widened intermediate body portion 3 and relatively narrow ends 4 and 5. The edges of the body portion 3 are serrated as at 6 and are arcuate. A pivot 7 connects the plates together with the corners of the body superimposed so that the sections may be hinged in respect to each other to receive between the serrated edges 6 a battery terminal. A coil spring 8 is connected to the ends 4 and tends to draw these ends together. A sleeve 9 is disposed about the coil spring between the ends 4 and limits the inward movement of these ends toward each other. One of the ends 5 is provided with a bendable extension 10 which may be bent about a conduit so that the conduit may be soldered in the sockets thus formed.

From the above detailed description it will be seen that the ends 5 may be manually moved toward each other for opening the jaw forming section so that they may be placed on a terminal or released from a terminal. The spring 8 will be sufficiently strong to draw the ends 4 toward each other so as to embed the serrated edges in the battery terminal for providing a good electrical connection. The structure is exceedingly simple, easy to manipulate and may be made strong and durable at low cost.

It is thought that the construction, utility and advantages of the invention will now be quite apparent to those skilled in this art without a more detailed description thereof. The preferred embodiment of the invention has been disclosed in detail merely by way of example since by actual practice it attains the features of advantage enumerated as desirable in the statement of the invention and the above description. It will be apparent that changes in the details of construction may be resorted to without departing from the spirit or scope of this invention as hereinafter claimed or sacrificing any of its advantages.

Having thus described my invention, what I claim as new is:

1. A device of the class described comprising a pair of plate like elongated sections having intermediate widened portions forming bodies adjacent edges of which are arcuate and serrated, the ends of the sections being relatively small in width, a pivot pin connecting corners of the body in superimposed relation, a spring connecting one set of ends of the section to normally draw them toward each other, one of the other ends being provided with a bendable socket forming extension.

2. A device of the class described comprising a pair of plate like elongated sections having intermediate widened portions forming bodies adjacent edges of which are arcuate and serrated, the ends of the sections being relatively small in width, a pivot pin connecting corners of the body in superimposed relation, a spring connecting one set of ends of the section to normally draw them toward each other, a sleeve about the spring limiting the movement of said last mentioned end toward each other, one of the other ends being provided with a bendable socket forming extension.

In testimony whereof I affix my signature.

WILLIAM T. STONE.